(12) United States Patent
Probst et al.

(10) Patent No.: US 7,074,520 B2
(45) Date of Patent: Jul. 11, 2006

(54) CONTOURED CASING OF MATING CLAMSHELL PORTIONS FOR AN ELECTROCHEMICAL CELL

(75) Inventors: Joseph M. Probst, Williamsville, NY (US); Philip S. Wutz, Williamsville, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 0 days.

(21) Appl. No.: 11/163,943

(22) Filed: Nov. 4, 2005

(65) Prior Publication Data

US 2006/0040178 A1   Feb. 23, 2006

Related U.S. Application Data

(62) Division of application No. 10/198,231, filed on Jul. 18, 2002, now Pat. No. 6,977,124.

(60) Provisional application No. 60/306,647, filed on Jul. 19, 2001.

(51) Int. Cl.
*H01M 2/04* (2006.01)

(52) U.S. Cl. ....................................... 429/176

(58) Field of Classification Search ................ 429/176, 429/185
See application file for complete search history.

(56) References Cited

U.S. PATENT DOCUMENTS

| D015,453 | S | 10/1884 | Evans | D13/103 |
|---|---|---|---|---|
| 0,337,045 | A | 3/1886 | Carter | 206/524.3 |
| 0,906,644 | A | 12/1908 | Meade | 206/237 |
| 1,402,591 | A | 1/1922 | Gallus | 429/186 |
| 2,861,117 | A | 11/1958 | Sindel et al. | 429/162 |
| 3,897,265 | A | 7/1975 | Jaggard | 136/66 N |
| 4,659,636 | A | 4/1987 | Suzuki et al. | 429/54 |
| 4,894,295 | A | 1/1990 | Cheiky | 429/77 |
| D307,886 | S | 5/1990 | Ching, Jr. et al. | D13/103 |
| 5,240,788 | A | 8/1993 | Eales | 429/156 |
| 5,270,133 | A | 12/1993 | Baumann, III | 429/53 |
| 5,288,565 | A | 2/1994 | Gruenstern | 429/153 |
| 5,326,652 | A | 7/1994 | Lake | 429/127 |
| 5,486,215 | A | 1/1996 | Kelm et al. | 29/623.1 |
| 5,486,431 | A | 1/1996 | Tuttle et al. | 429/66 |
| 5,549,717 | A | 8/1996 | Takeuchi et al. | 29/623.2 |
| 5,556,722 | A | 9/1996 | Narukawa et al. | 429/163 |
| 5,603,737 | A | 2/1997 | Marincic et al. | 29/23.1 |
| 5,629,107 | A | 5/1997 | Shioda et al. | 429/128 |
| 5,683,831 | A | 11/1997 | Baril et al. | 429/96 |
| 5,716,728 | A | 2/1998 | Smesko et al. | 429/60 |
| 5,776,632 | A * | 7/1998 | Honegger | 429/185 |
| D399,819 | S | 10/1998 | Iida | D13/103 |
| 5,895,414 | A | 4/1999 | Sanchez-Zambrano | 607/36 |
| 5,905,001 | A | 5/1999 | Elliott et al. | 429/169 |
| 5,926,362 | A | 7/1999 | Muffoletto et al. | 361/503 |
| 5,958,088 | A | 9/1999 | Vu et al. | 29/623.1 |

(Continued)

FOREIGN PATENT DOCUMENTS

EP   0 202 857 B1   5/1986

(Continued)

OTHER PUBLICATIONS

McGraw-Hill, Handbook of Batteries Third Edition.

*Primary Examiner*—Patrick Joseph Ryan
*Assistant Examiner*—Thomas H. Parsons
(74) *Attorney, Agent, or Firm*—Michael F. Scalise

(57) ABSTRACT

The present invention provides an electrochemical cell of either a primary or a secondary chemistry housed in a casing having opposed major side walls of a contoured shape.

15 Claims, 13 Drawing Sheets

U.S. PATENT DOCUMENTS

| | | | |
|---|---|---|---|
| 6,004,693 A | 12/1999 | Fukuda et al. | 429/176 |
| 6,020,086 A | 2/2000 | Van Lerberghe | 429/163 |
| 6,040,084 A | 3/2000 | Kurasawa et al. | 429/176 |
| 6,048,642 A | 4/2000 | Woolsey | 429/163 |
| 6,176,879 B1 | 1/2001 | Reischl et al. | 623/11.11 |
| 6,265,102 B1 | 7/2001 | Shrim et al. | 429/172 |
| 6,334,879 B1 | 1/2002 | Muffoletto et al. | 29/25.03 |
| 6,445,948 B1 | 9/2002 | Somdahl et al. | 607/2 |
| 6,445,951 B1 | 12/2002 | Larson et al. | 607/28 |
| D496,331 S | 9/2004 | Nan | D13/103 |
| 2001/0049057 A1 | 12/2001 | Frustaci et al. | |
| 2003/0040781 A1 | 2/2003 | Larson et al. | |
| 2003/0129487 A1 | 7/2003 | Inoue et al. | |

FOREIGN PATENT DOCUMENTS

| | | |
|---|---|---|
| EP | 0 928 035 A1 | 7/1999 |
| GB | 1 468 120 | 10/1975 |
| GB | 2 137 801 A | 10/1984 |
| JP | 60044957 A | 3/1985 |
| JP | 06181069 | 6/1994 |
| JP | 10199493 | 7/1998 |
| JP | 11307130 | 11/1999 |
| WO | WO 95/06958 | 3/1995 |
| WO | WO 97/38455 | 10/1997 |
| WO | WO 01/82393 A2 | 11/2001 |

\* cited by examiner

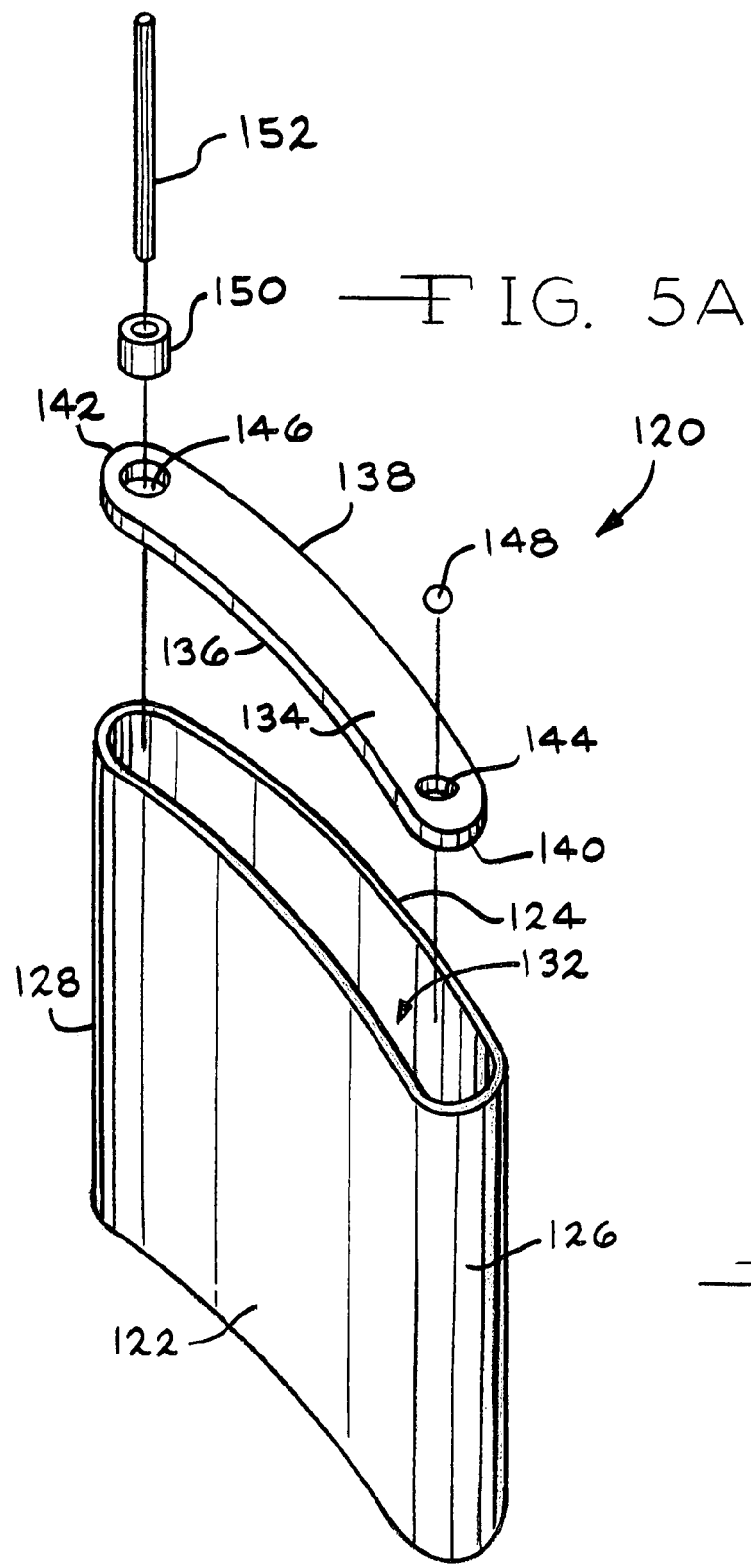

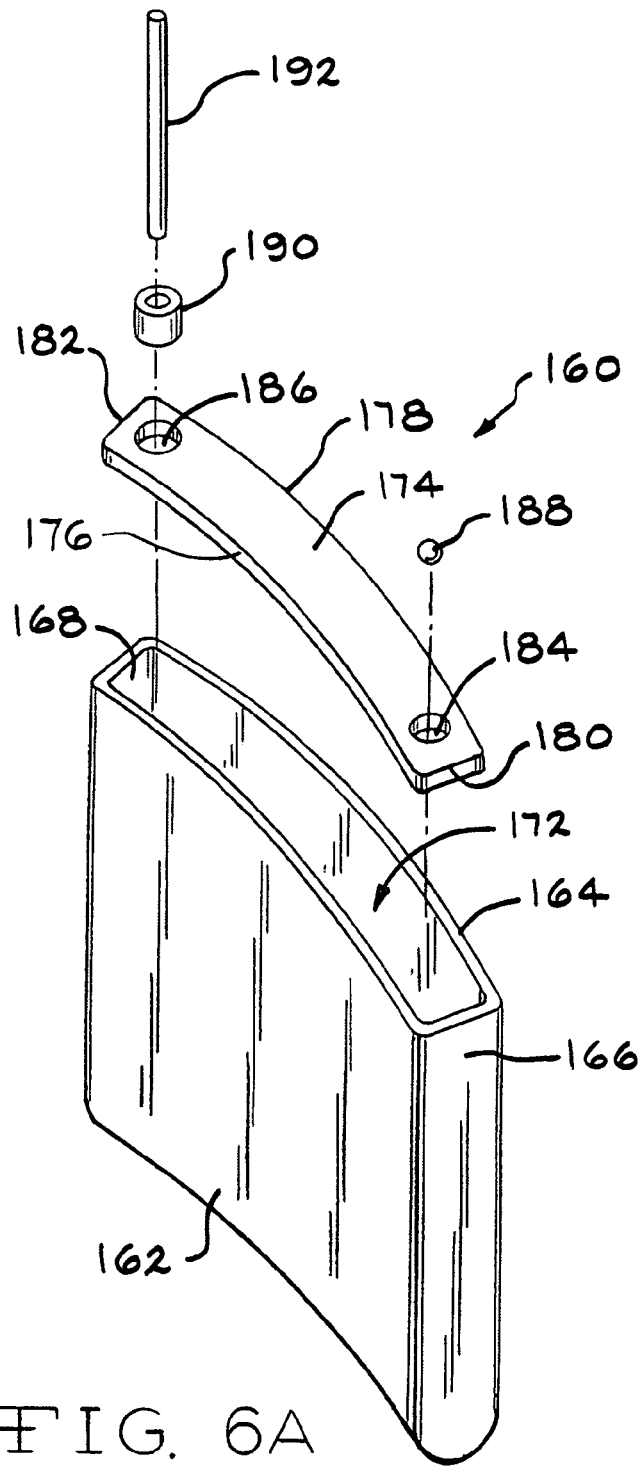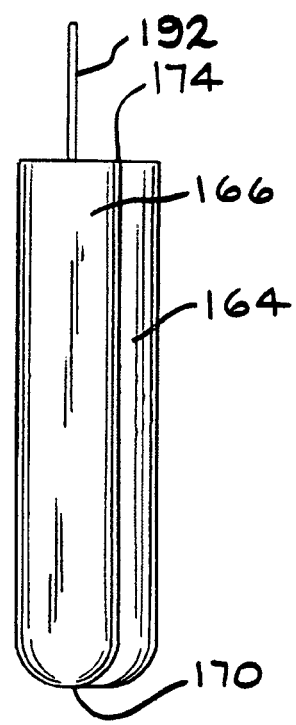
FIG. 6A
FIG. 6B

CONTOURED CASING OF MATING CLAMSHELL PORTIONS FOR AN ELECTROCHEMICAL CELL

BACKGROUND OF THE INVENTION

1. Field of the Invention

The present invention relates to electrochemical cells generating electrical energy by means of chemical reactions. More specifically, the invention relates to casings for electrochemical cells, the cells being particularly adapted for powering implantable devices. For that reason, the casings have contoured surfaces to more closely conform to body contours. This facilitates implantation in areas of a body that were heretofore not possible because of geometrical limitations.

2. Prior Art

Recent developments in small electronic devices having various shape and size requirements necessitate comparably small-sized electrochemical cells that are easily manufactured and used in these electronic devices. Preferably, these types of cells are of a high energy density, such as is provided by those predicated on a lithium chemistry. One widely used configuration is to house the high energy density cell in a prismatic-shaped casing 10, as shown in FIG. 1. Whether the cell is of a primary or a secondary chemistry is not important. The casing 10 includes a planar front side wall 12 opposite a planar back side wall (not shown), both of which extend to and meet with a right end wall 14 and an opposed left end wall (not shown). The front and back side walls and the right and left end walls extend to and meet with a planar bottom wall (not shown) in a unitary construction referred to as a deep drawn casing. This unitary casing design has a generally rectangular shape with the front and back side walls being parallel to each other and the right and left end walls being parallel. An alternate construction is to provide individual plates which are connected together as side walls and end walls to form the rectangularly-shaped prismatic casing.

In any event, the connected side walls and end walls form an opening closed by a generally planar lid 16. The lid 16 has a rectangular shape and is welded about its periphery to the upper edges of the respective side walls and end walls. The lid includes a fill opening 18 and a terminal pin opening 20. The fill opening 18 is a port for providing an electrolyte into the casing after an electrochemical couple is housed therein. The port is closed by a closure member, such as a ball 22, sealed therein.

The terminal pin opening 20 supports a glass-to-metal seal comprising a ring of insulative glass 24 surrounding a terminal pin 26 having its interior end (not shown) connected to one of the anode and cathode electrodes housed inside the casing. That way, the terminal pin 26 serves as one of the cell leads. The casing 10, insulated from the terminal pin 26 by the glass-to-metal seal 24, serves as the lead for the other electrode.

The major draw back with the prismatic shaped casing 10 is that it is not necessarily the most optimum or desired shape, for example when the cell is intended to be implanted into a human body, and the like. In such applications, a prismatic shaped housing may not represent the best or most efficient usage of space in the body. According to the present invention, a casing having a contoured shaped is more preferred.

A hybrid casing construction is described in U.S. Pat. No. 5,958,088 to Vu et al. This patent shows a prismatic casing having partially contoured side walls. The cell casing includes opposed major side walls, one having a concave arc while the other has an opposed convex arc. The cell electrodes are disposed within the casing and deflected in a spring like manner to follow the arcs of the opposed side walls. That way, the casing maintains a positive pressure against the cell electrodes. The problem is that while the opposed side walls are arced, the intermediate surrounding end wall does not follow their contours. This makes the Vu et al. casing design impractical for implantation in the human body when a fully contoured shape is most preferred.

Accordingly, there is a need for cells housed in casings having fully contoured side walls more closely matching the shape of the human body than does a prismatic casing.

SUMMARY OF THE INVENTION

Presently, primary lithium cells are used for implantable medical applications such as pacemakers, implantable defibrillators, neurostimulators and drug pumps, while lithium ion rechargeable cells power hearing-assist devices, artificial hearts and heart-assist devices. These cells are generally housed inside casings having planar side walls, such as in a prismatic casing. However, the shape of a cell package is critical for implantable devices since the casing's form requires the device manufacturer to design electronics and ancillary devices around the limiting criteria of the casing. Also, if an area of the body, such as the skull, must be excavated, a conventional prismatic cell case requires that the cavity be shaped to fit the planar prismatic design. This may necessitate more excavation than would be required if the casing is contoured to fit the patient's anatomy. Furthermore, the planar design of current prismatic cases excludes certain locations in the body from having medical devices implanted therein.

BRIEF DESCRIPTION OF THE DRAWINGS

FIG. 5A is an exploded view of one embodiment of a contoured deep drawn cell casing 30 according to the present invention.

FIG. 5B is a side elevational view of the casing 30 shown in FIG. 5A.

FIG. 6A is an exploded view of another embodiment of a contoured deep drawn cell casing 70 according to the present invention.

FIG. 6B is a side elevational view of the casing 70 shown in FIG. 6A.

DETAILED DESCRIPTION OF THE PREFERRED EMBODIMENTS

The casings of this invention are preferably of conductive materials selected from nickel, aluminum, stainless steel, mild steel, tantalum and titanium.

Figure 1:
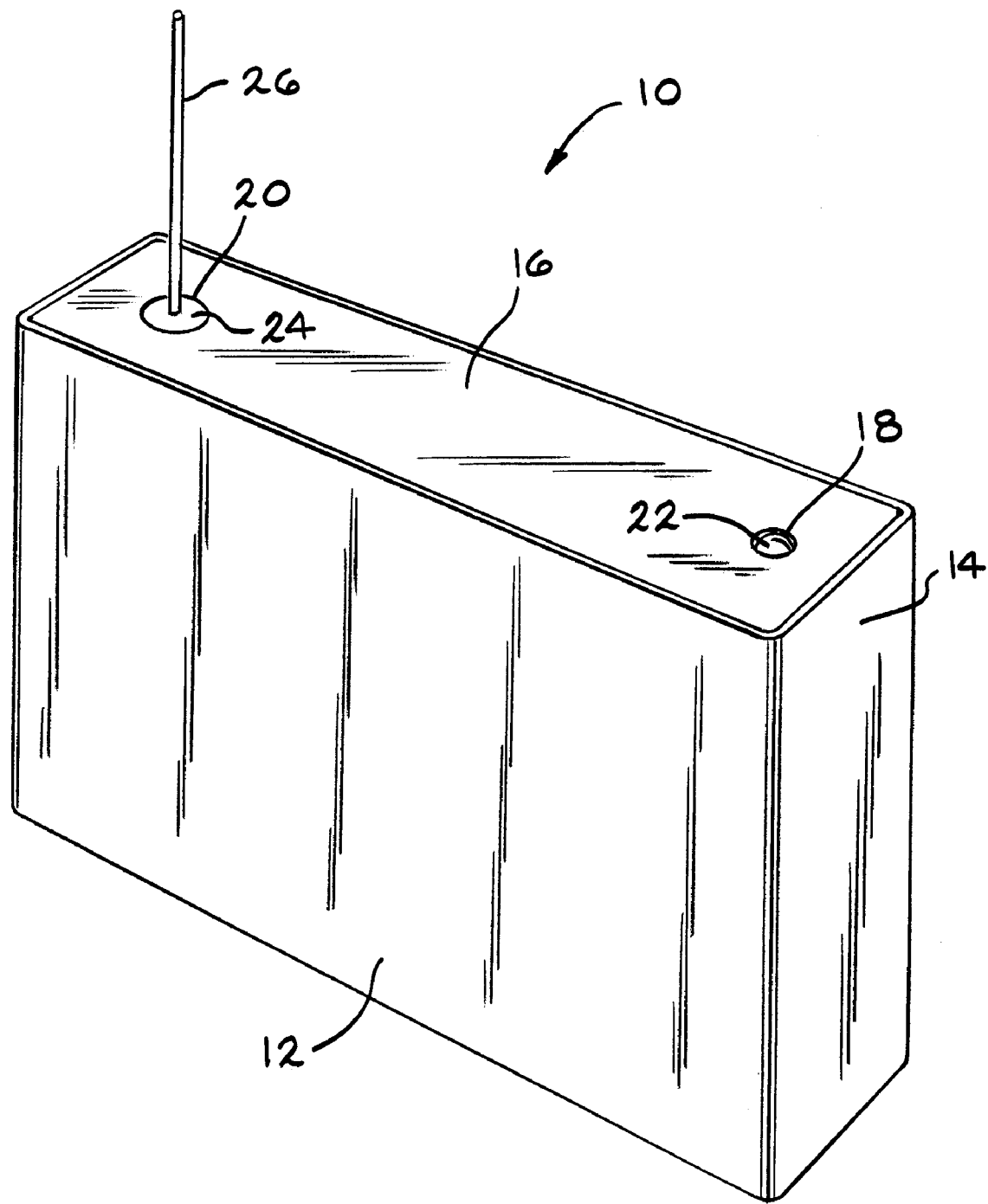
FIG. 1 is a perspective view of a conventional prismatic casing 10.
Figure 2:
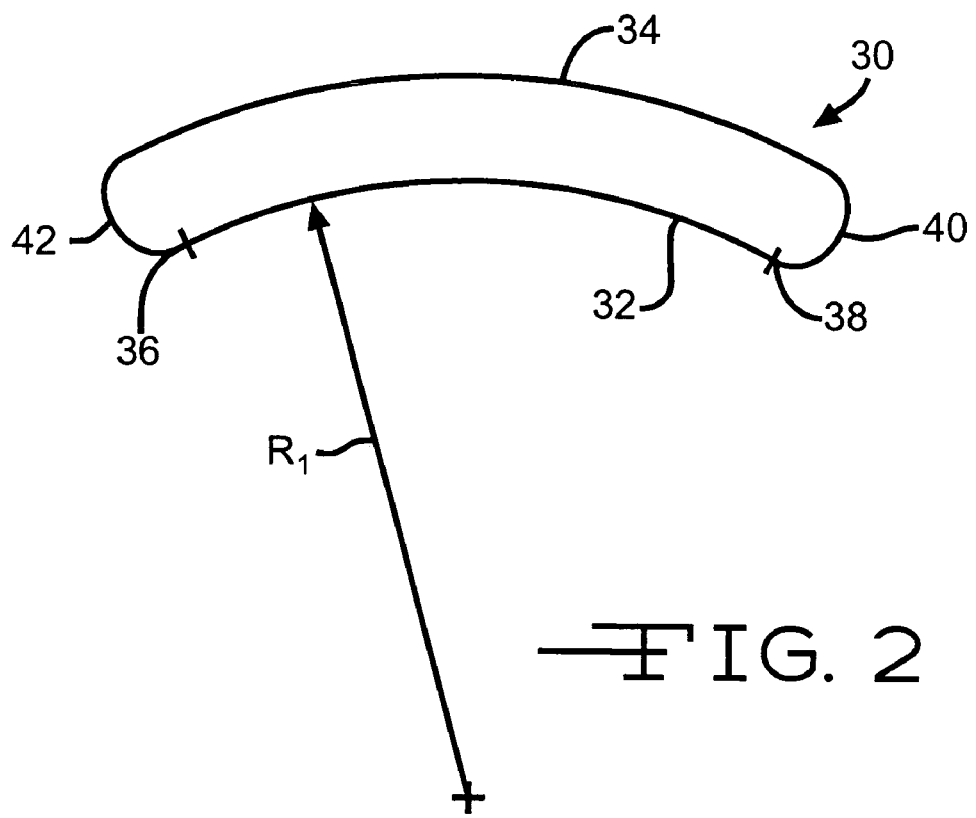
FIG. 2 is a schematic cross-sectional view of a casing having opposed major curved side walls of a radius $R_1$.
Figure 3:
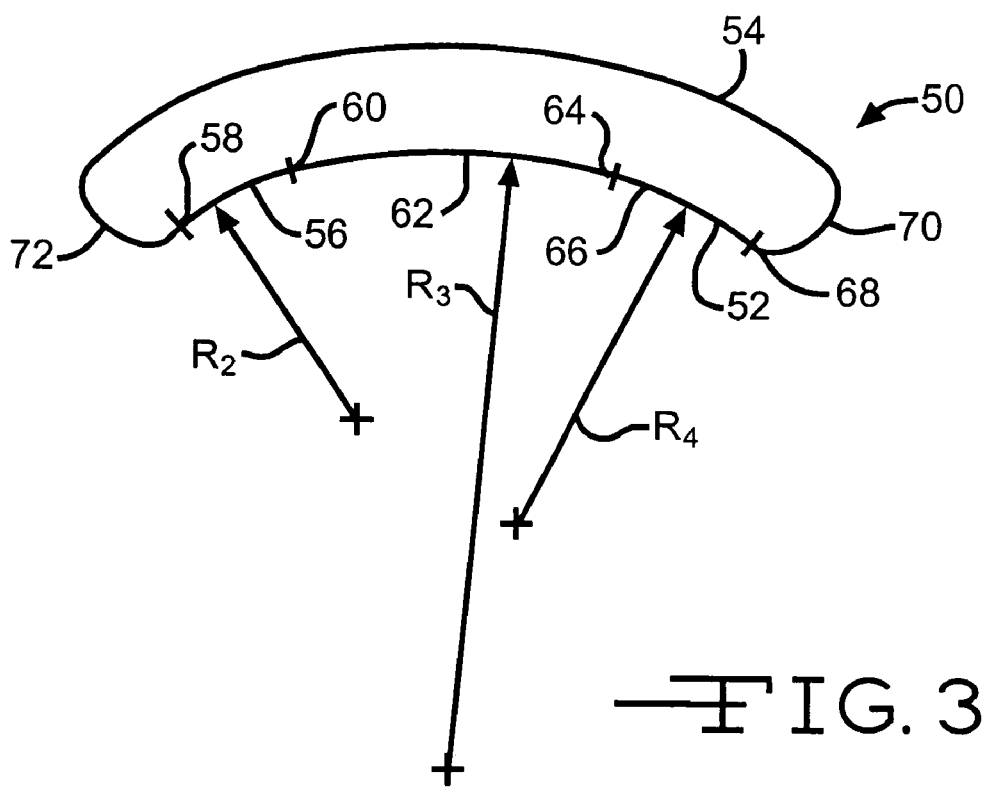
FIG. 3 is a schematic cross-sectional view of a casing having opposed major curved side walls of varying radii $R_2$ to $R_4$.
Figure 4:
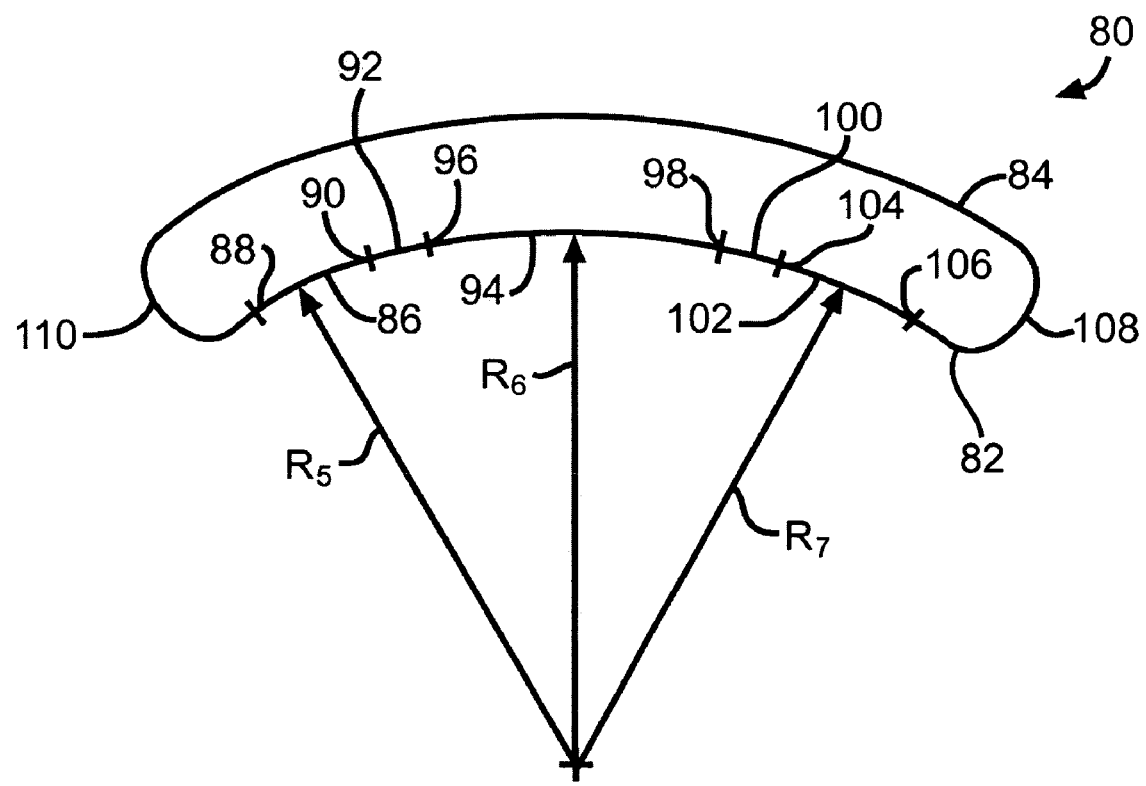
FIG. 4 is a schematic cross-sectional view of a casing having opposed major curved side walls of varying radii $R_5$ to $R_6$ with intermediate planar sections.

Referring now to FIGS. 2 to 4, there is shown representative schematic cross-sectional views of casings having contoured or curved opposed major side walls according to the present invention. In FIG. 2, the casing 30 comprises spaced apart and opposed major first and second side walls 32 and 34, each of a curvature defined by the radius $R_1$ moving along a path from tangent point 36 to tangent point 38. The radius $R_1$ is not shown for the second side wall 34, however, it is the same as that of the first side wall 32. The side walls 32, 34 extend to curved end walls 40 and 42 and a bottom wall (not shown). As will be explained in detail hereinafter, the casing 30 is closed by a lid (not shown).

FIG. 3 shows another embodiment of a casing 50 comprising spaced apart and opposed major first and second curved side walls 52 and 54. The first major side wall 52 is comprised of a first curved portion 56 defined by radius $R_2$ moving along a path from tangent point 58 to tangent point 60 where the side wall transitions to a second curved portion 62 defined by radius $R_3$ moving along a path from tangent point 60 to tangent point 64. At tangent point 64, the second curved portion 62 transitions to a third curved portion 66 defined by radius $R_4$ moving along a path from tangent point 64 to tangent point 68.

As the drawing shows, the length of the radius $R_2$ is less than that of both $R_3$ and $R_4$ while the length of radius $R_4$ is less than that of $R_3$. The second major side wall 54 is similar in its contoured or curved shape. The side walls 52 and 54 extend to curved end walls 70 and 72 and a bottom wall (not shown). The casing 50 is then closed by a lid (not shown).

It is within the scope of the present invention that the arrangement of the respective curved portions 56, 62 and 66 can be rearranged in any sequence or manner. Also, there can be only two different curved portions in a side wall or more than three. The exact number and their arrangement is only limited by the parameters of the particular application in which the electrochemical cell will be used.

FIG. 4 shows another embodiment of a casing 80 comprising spaced apart and opposed major first and second curved side walls 82 and 84 according to the present invention. The first major side wall 82 is comprised of a first curved portion 86 defined by radius $R_5$ moving along a path from tangent point 88 to tangent point 90 where the side wall transitions to a first planar or straight portion 92. The first planar portion 92 then transitions to a second curved portion 94 defined by radius $R_6$ moving along a path from tangent point 96 to tangent point 98. At tangent point 98, the side wall 82 transitions to a second planar portion 100 which, in turn, transitions to a third curved portion 102 defined by radius $R_7$ moving along a path from tangent point 104 to tangent point 106.

As the drawing shows, the lengths of radii $R_5$, $R_6$ and $R_7$ are equal. However, as described above with respect to FIG. 3, that is not necessary. The lengths of planar portions 92 and 102 are equal, however, that is also not necessary. There can be more or less than two planar portions in a side wall and they can be continuous and angled with respect to each other or separated from each other by one or more curved portions.

Again, the second major side wall 84 is similar in shape to the first side wall 82. The side walls 82 and 84 extend to curved end walls 108 and 110 and a bottom wall (now shown). The casing 80 is then closed by a lid (not shown).

Turning to FIGS. 5A, 5B, 6A, 6B and 7, these drawings show respective contoured casings 120, 160 and 200 according to the present invention. In particular, casings 120 and 160 are of a deep drawn construction while casing 200 is of mating clam shells.

The casing 120 illustrated in FIGS. 5A and 5B includes spaced apart and opposed major front and back side walls 122 and 124 extending to and meeting with curved right and left end walls 126 and 128. The side walls 122, 124 and end walls 126, 128 are connected to a planar bottom wall 130 forming the casing as a unitary, deep drawn member. Both of the major front and back side walls 122, 124 have a curved shape of a continuous radius deflecting in a similar direction and extending from the right and left end walls 126, 128. The curvatures of the front and back side walls 122, 124 are the same, although that is not necessary. As will be described in detail hereinafter, in some casing designs it may be beneficial to provide one or the other of the front and back side walls having a greater curvature than the other. For example, it may be useful to provide the front wall 122 with a greater curvature than the back wall 124. This would optimize casing internal volume while maintaining casing curvature for implantation purposes and the like.

The side walls and end walls of the deep drawn casing 120 form an opening 132 closed by a generally planar lid 134. Lid 134 has a peripheral shape matching that of the opening 132 and formed of a concave edge 136 opposite a convex edge 138, both of which extend to and meet with curved right and left edges 140 and 142. That way, when the lid 134 is secured to the upper edges of the casing side walls and end walls, the opening 132 is closed in a hermetic manner.

The lid includes a fill opening 144 and a terminal pin opening 146. The fill opening 144 is a port for providing an electrolyte into the casing after an electrochemical couple is housed therein and is closed by a closure member, such as a ball 148, sealed therein.

The terminal pin opening 146 supports a glass-to-metal seal comprising a ring of insulative glass 150 surrounding a terminal pin 152 having its interior end (not shown) connected to one of the anode and cathode electrodes housed inside the casing. That way, the terminal pin 152 serves as one of the electrode leads. The casing 120, insulated from the terminal pin 152 by the glass-to-metal seal 150, serves as the lead for the other electrode.

FIGS. 6A and 6B illustrate another embodiment of a contoured casing 160 including spaced apart and opposed major front and back side walls 162 and 164 extending to and meeting with planar right and left end walls 166 and 168. The side walls 162, 164 and end walls 166, 168 are connected to a curved bottom wall 170 forming the casing as a unitary, deep drawn member. Both of the major front and back side walls 162, 164 have a curved shape of a continuous radius deflecting in a similar direction and extending from the planar right and left end walls 166, 168. The curvatures of the front and back side walls 162, 164 are the same, however, as discussed with respect to casing 120, that is not necessary.

The side walls and end walls of the deep drawn casing 160 form an opening 172 closed by a generally planar lid 174. Lid 174 has a peripheral shape matching that of the opening 172 and formed of a concave edge 176 opposite a convex edge 178, both of which extend to and meet with straight right and left edges 180 and 182. That way, when the lid 174 is secured to the upper edges of the casing side walls and end walls, the opening 172 is closed in a hermetic manner.

As with the casing 120 of FIGS. 5A and 5B, the lid 174 includes a fill opening 184 and a terminal pin opening 186. The fill opening 184 is used to provide an electrolyte into the casing after an electrochemical couple is housed therein, and is sealed closed with a ball 188.

The terminal pin opening 186 supports a glass-to-metal seal comprising a ring of insulative glass 190 surrounding a terminal pin 192 having its interior end (not shown) connected to one of the anode and cathode electrodes housed inside the casing. That way, the terminal pin 192 serves as one of the electrode leads. The casing 120, insulated from the terminal pin 192 by the glass-to-metal seal 190, serves as the lead for the other electrode.

Figure 7:
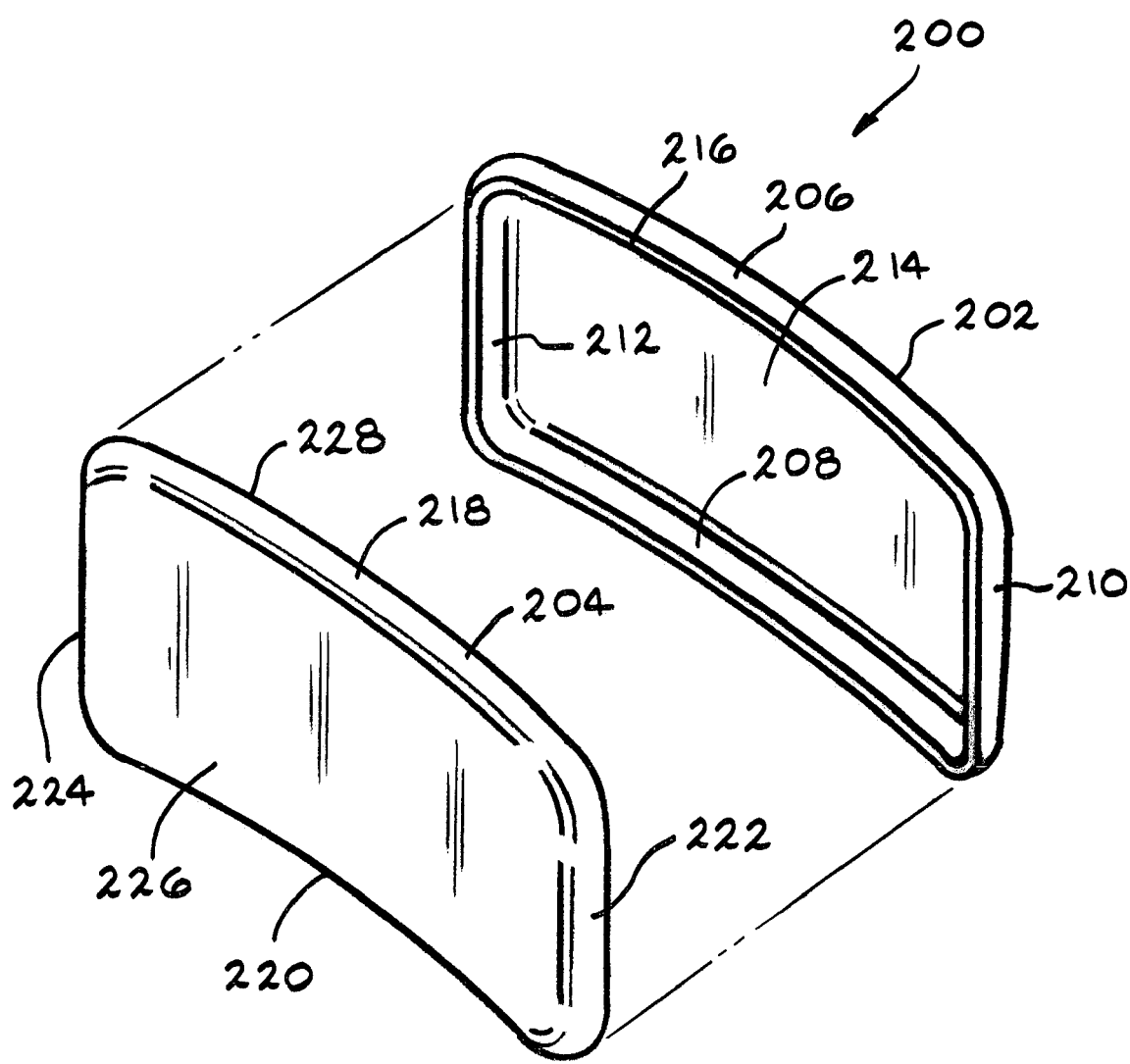
FIG. 7 is a perspective view of contoured clam shell casing halves 112 and 114 for another embodiment of a contoured casing 110.

FIG. 7 illustrates another embodiment of a contoured casing 200 according to the present invention. The casing has first and second clam shell portions 202 and 204 mated together and sealed about their periphery to provide a hermetic enclosure for an electrode assembly. The first clam shell 202 has a surrounding wall comprised of spaced apart side walls 206 and 208 extending to and meeting with spaced apart end walls 210 and 212. The side walls 206, 208 and the end walls 210, 212 meet each other at rounded corners and extend to a curved front wall 214 of a generally concave shape. Opposite the front wall 214 is a continuous edge 216 of the side walls 206, 208 and end walls 210, 212.

The second clam shell 204 has a surrounding wall comprised of spaced apart side walls 218 and 220 extending to and meeting with spaced apart end walls 222 and 224. The side walls 218 and 220 and end walls 222 and 224 meet at rounded corners and extend to a curved front wall 226 of a generally concave shape. Opposite the front wall is a continuous edge 228 of the side walls 218, 220 and end walls 222, 224.

The clam shells 202 and 204 are sized such that one of them has its side walls and end walls of a somewhat shorter length than those of the other. That way, after an electrochemical couple is nested in the one clam shell having the shorter side walls and end walls, the other clam shell is mated thereto. In this position, the shorter side walls and end walls are received in a closely spaced relationship partially covered by the somewhat longer side walls and end walls of the other clam shell. The one continuous edge 216, 228 of the larger clam shell is then secured to the side walls and end walls of the other clam shell, such as by welding. This provides a hermetic closure for the casing 220 having the major concave walls 214, 226 spaced from one another but of a similar curvature deflecting in a similar direction. While not shown in the drawing, the cell is provided with an electrolyte fill opening and a terminal pin insulated from the casing by a glass-to-metal seal, in a similar manner as the previously described cells 120, 160.

It is also within the scope of the present invention that the clam shells are butted together before they are sealed. This means that instead of the side walls and end walls of one of the clam shells being shorter than those of the other, they are of equal lengths. The butted edges are sealed together such as by welding to form a hermetic enclosure.

Figure 8:
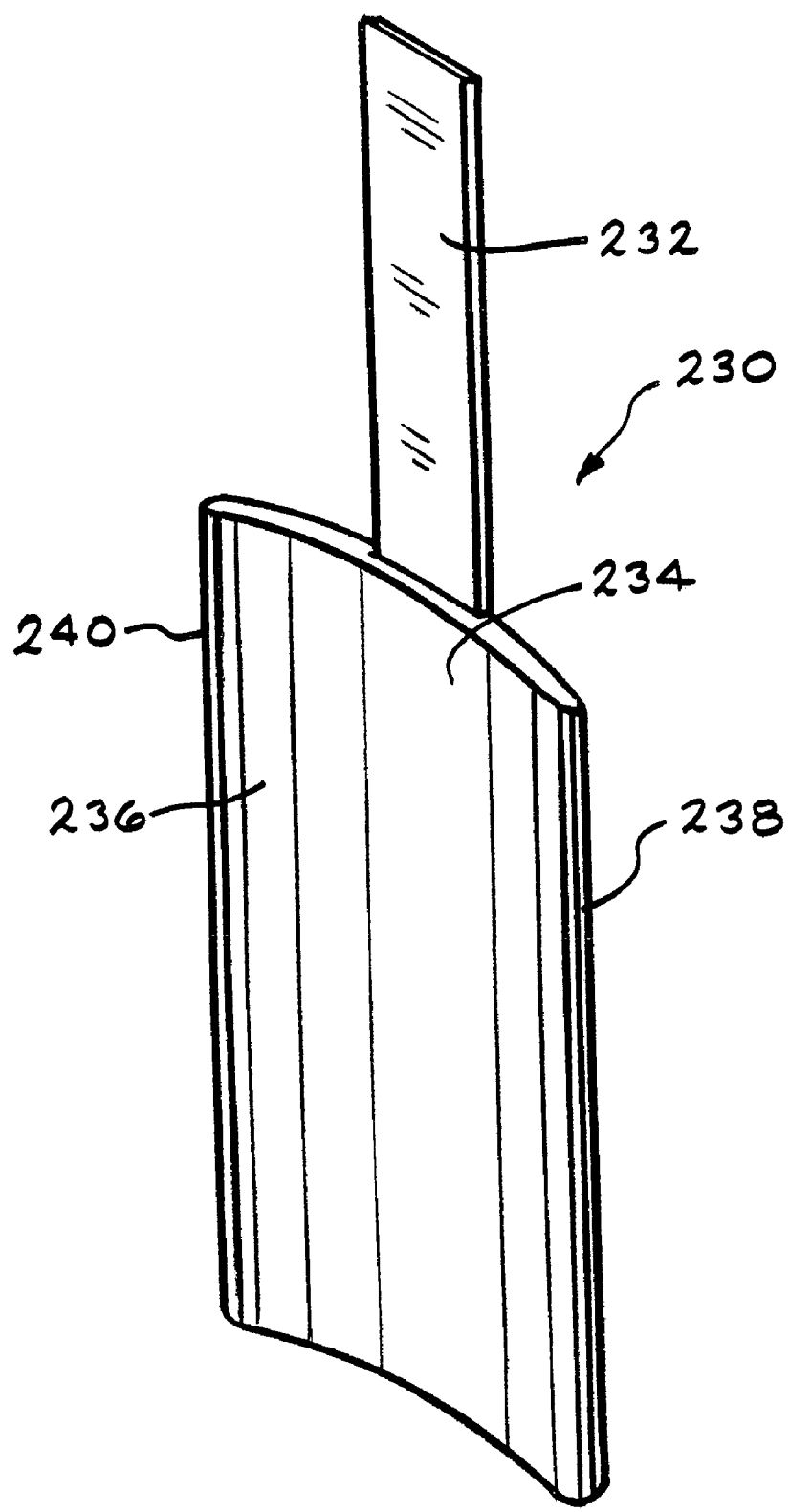
FIG. 8 is a perspective view of a contoured winding mandrel.

FIG. 8 illustrates a winding mandrel 230 for forming a wound cell stack having a contoured shape suitable for housing in the casing 120. The mandrel 230 includes a shaft 232 secured to a contoured plate 234. The contoured plate 234 comprised spaced apart first and second curved faces (only face 236 shown) extending to and meeting with curved ends 238 and 240. Preferably, the curvatures of the first and second faces deflect in a similar direction and are substantially similar to that of the front and back side walls 122, 124 of the casing 120, the front and back walls 162, 164 or casing 160 and the curved walls 214 and 226 of casing 200.

Figure 9:
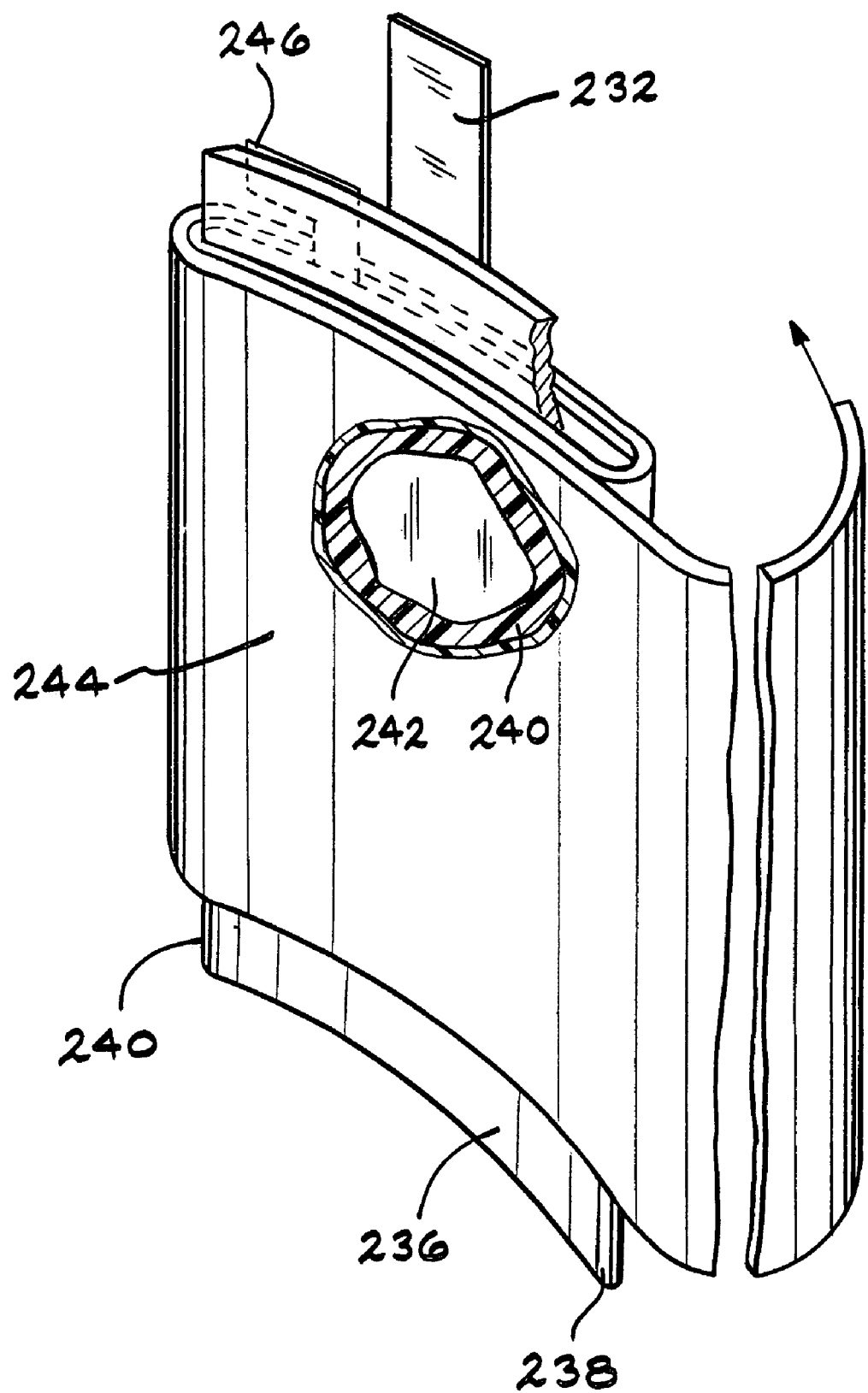
FIG. 9 is a perspective view of a wound cell stack using the winding mandrel shown in FIG. 8.

FIG. 9 illustrates use of the winding mandrel 230 to provide an electrode assembly as a wound cell stack for housing in the casing 120. The cell stack has a negative electrode structure, preferably in sheet form, comprising an anode active material for a primary cell or an anode material capable of intercalating and deintercalating an anode active material for a secondary cell. The negative electrode sheet is overlayed on top of a positive electrode structure, preferably in sheet form, comprising a cathode active material for either a primary or a secondary cell. The negative and positive electrodes are prevented from direct physical contact with each other by the provision of a separator material disposed there between. A preferred electrode active sheet is described in U.S. Pat. Nos. 5,435,874 to Takeuchi et al., 5,571,640 to Takeuchi et al. and 6,174,622 to Thiebolt, III et al., all of which are assigned to the assignee of the present invention and incorporated herein by reference.

For the sake of clarity, the drawing of the cell stack being wound in FIG. 9 depicts only one of the negative and positive electrodes. The depicted electrode comprises an active material 240 contacted to a current collector 242 and contained inside of a separator envelope 244. Which one of the electrodes is depicted is not important as they are both essentially the same in their general physical construction. A tab 246 extends from one of the electrodes, preferably the positive electrode.

Figure 10:
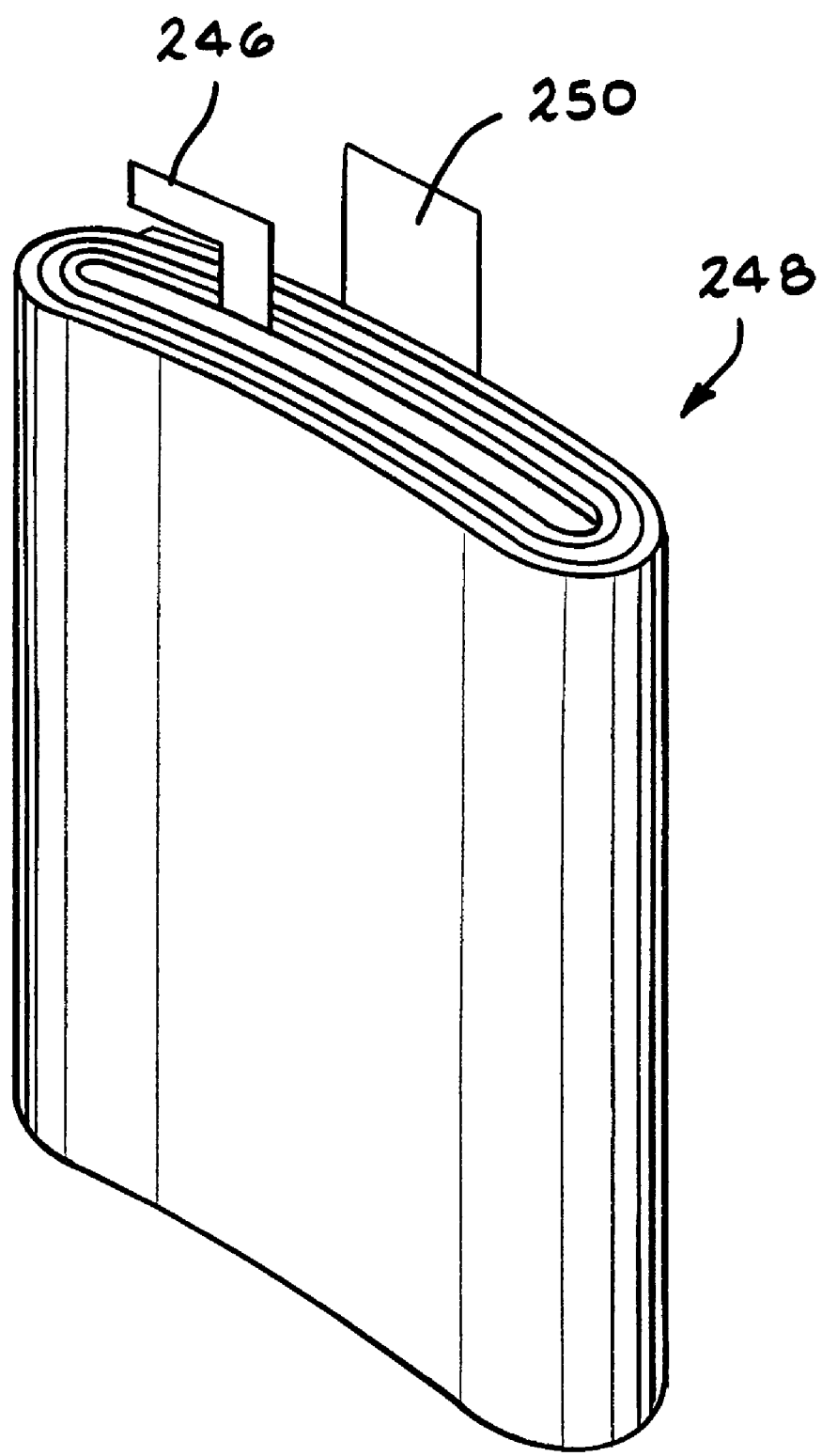
FIG. 10 is a perspective view of a contoured wound cell stack for use with the contoured casing 30 shown in FIGS. 5A and 5B.
Figure 11:
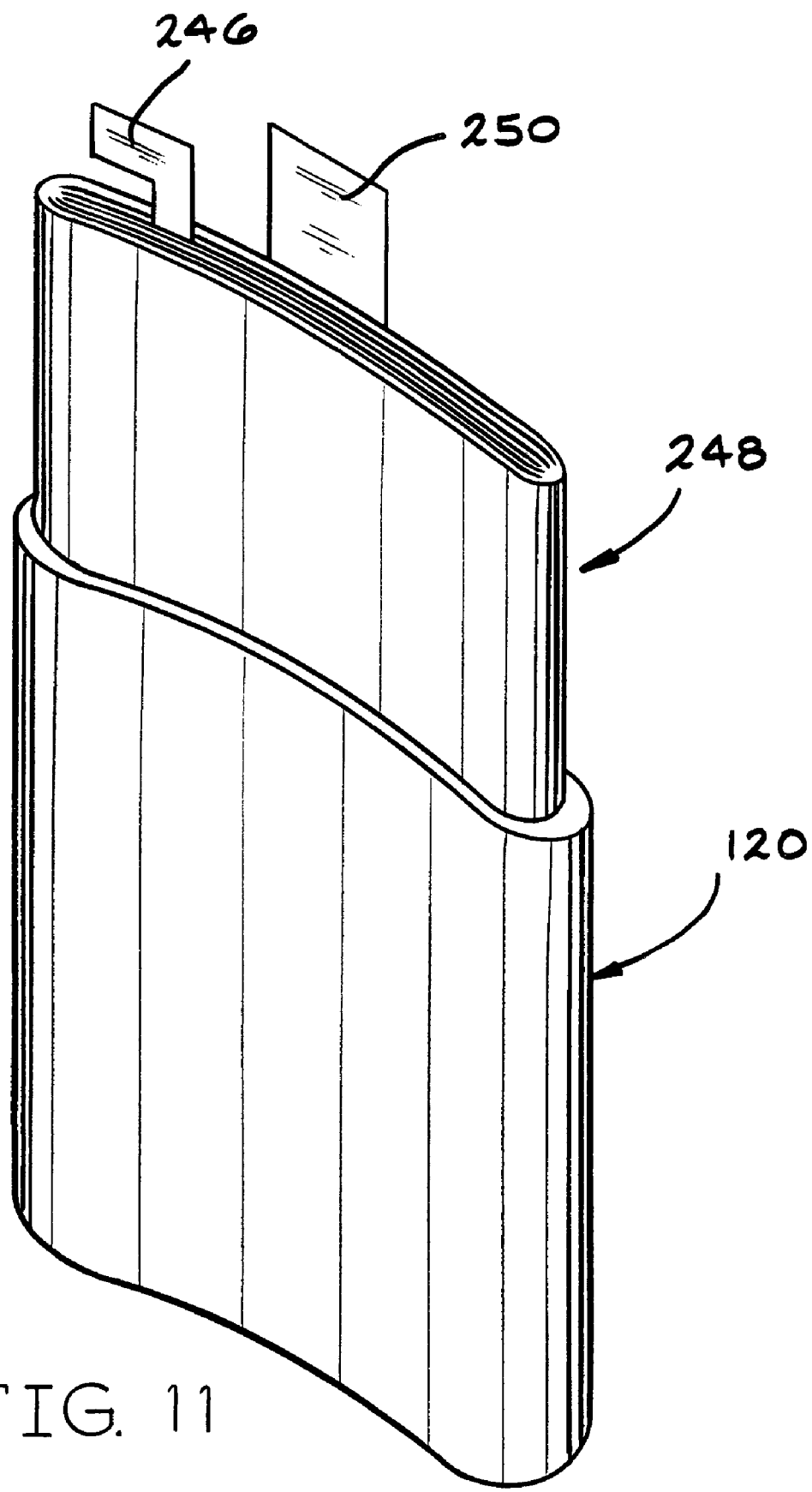
FIG. 11 is a perspective view of the contoured wound cell stack of FIG. 10 being inserted into the casing 30 of FIG. 5A.

FIG. 10 illustrates the final shape of the wound cell stack 248 for a contoured casing according to the present invention. The cell stack 248 includes a tab 250 extending from the other electrode, preferably the negative electrode. That way, when the wound cell stack is housed inside one of the deep down casings 120 (FIG. 11) or 160 (FIG. 6A) or in the casing 200 of mating clam shells 202, 204 shown in FIG. 7, the negative electrode tab 250 is connected to the casing while the positive electrode tab 246 is connected to the terminal pin. This provides the resulting cell in a case-negative design with the casing being the negative terminal and the pin being the positive terminal. If a case positive configuration is desired, the electrode configuration is reversed with the positive electrode tab 250 being connected to the casing and the negative electrode tab 246 being connected to the terminal pin. An important aspect of the present invention is that the winding mandrel conforms the cell stack to the shape of the casing. That way, when the cell stack is housed therein, there is no pressure on the cell stack other than that attributed to the anode and cathode electrode being wound together.

Figure 12:
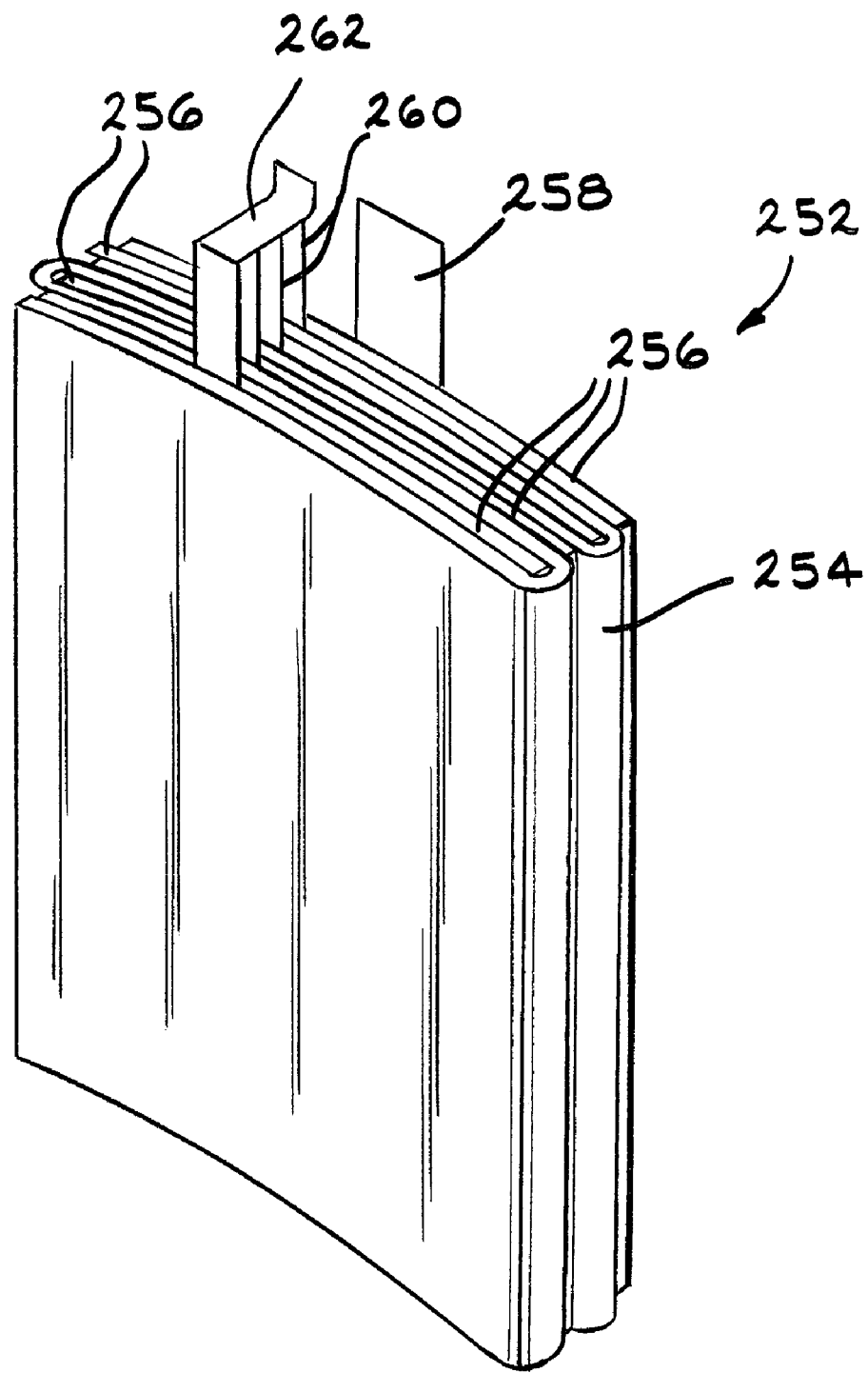
FIG. 12 is a perspective view of another embodiment of a contoured wound cell stack for use with the contoured casing 70 shown in FIGS. 6A and 6B.

FIG. 12 illustrates another configuration of a wound cell stack 252 according to the present invention. This cell stack is formed by taking a relatively long structure of one of the electrodes 254, for example, the anode, and folding it into a serpentine-like structure. Plates of the other electrode 256, for example, the cathode, are then interweaved between the folds of the anode electrode 256. For a more detailed description of this type of electrode assembly, reference is made to U.S. Pat. No. 4,964,877 to Keister et al, which is assigned to the assignee of the present invention and incorporated herein for reference.

As is the case with the cell stack 248, the cell stack 252 includes a tab 258 for the positive electrode and a tab 260 for each one of the cathode plates. The cathode tabs 260 are connected to a bus 262, which, in turn, connects to a terminal pin (not shown). The cell stack is then housed inside a casing according to the present invention.

Figure 13:
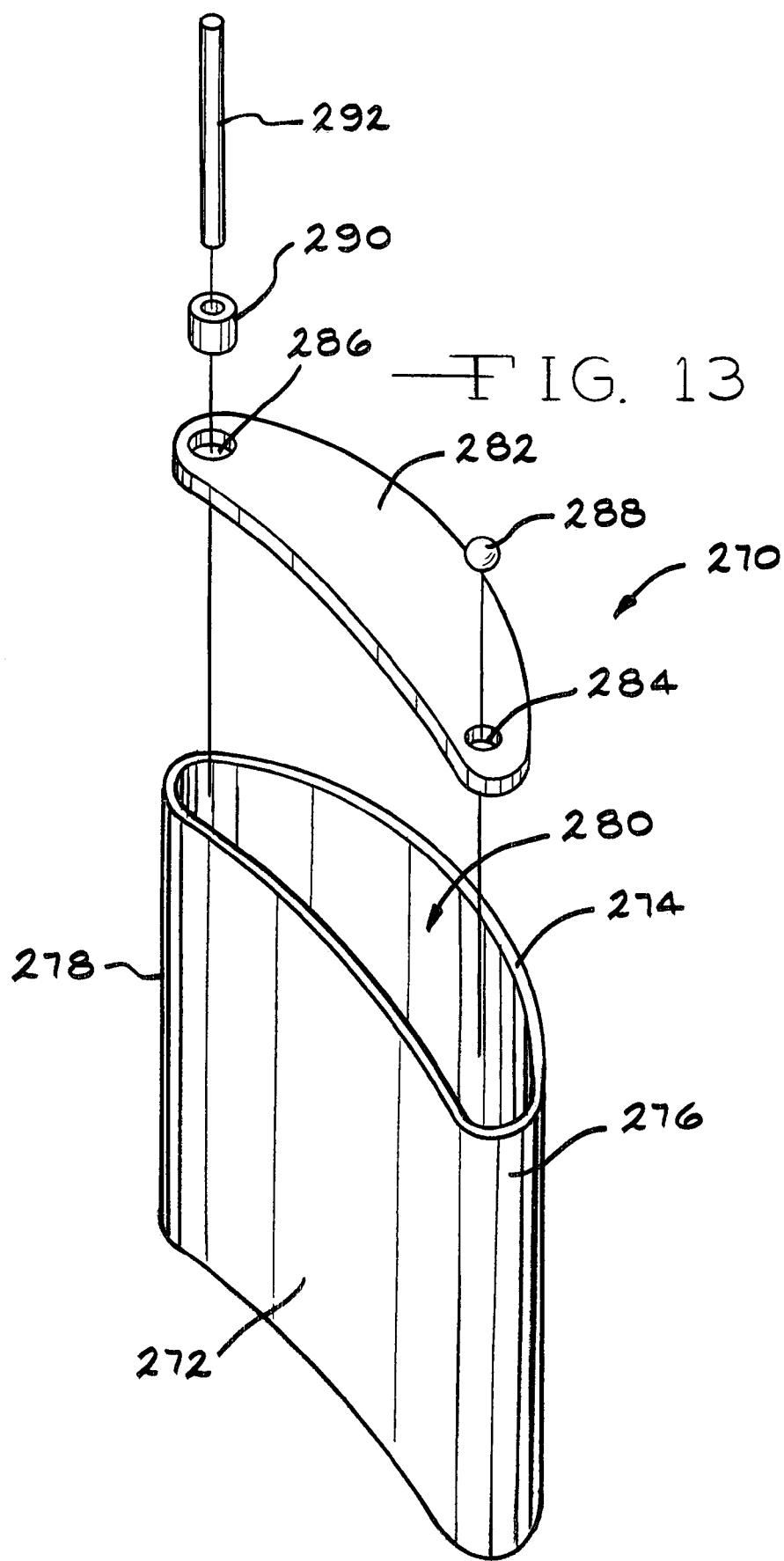
FIG. 13 is a perspective view of another embodiment of a contoured casing 270 according to the present invention having a front side wall 272 of a greater radial curvature than a back side wall 274.

FIG. 13 illustrates another embodiment of a contoured casing 270 having spaced apart and opposed major front and back side walls 272 and 274 extending to and meeting with curved right and left end walls 276 and 278. The side walls 272, 274 and end walls 276, 278 connect to a bottom wall (not shown) forming the casing as a unitary member, deep drawn member. Both of the major front and back side walls 272, 274 have a curved shape of a continuous radius deflecting in a similar direction and extending from the end walls 276, 278. However, the curvature of front wall 272 is less than that of back wall 274. This means that the radius of the front wall 272 is greater than the radius of the back wall 274.

The side walls and end walls of the deep drawn casing 270 form an opening 280 closed by a lid 282. Lid 282 has a peripheral shape matching that of the opening 280. When the lid is secured to the upper edges of the casing, the opening 280 is closed. The lid also includes an electrolyte fill opening 284 and a terminal pin opening 286. The fill opening is closed by ball 288 while the terminal pin opening 286 supports a ring of insulation glass 290 surrounding a terminal pin 292 for one of the anode and the cathode. The casing 270 serves as the terminal for the electrode.

Figure 14:
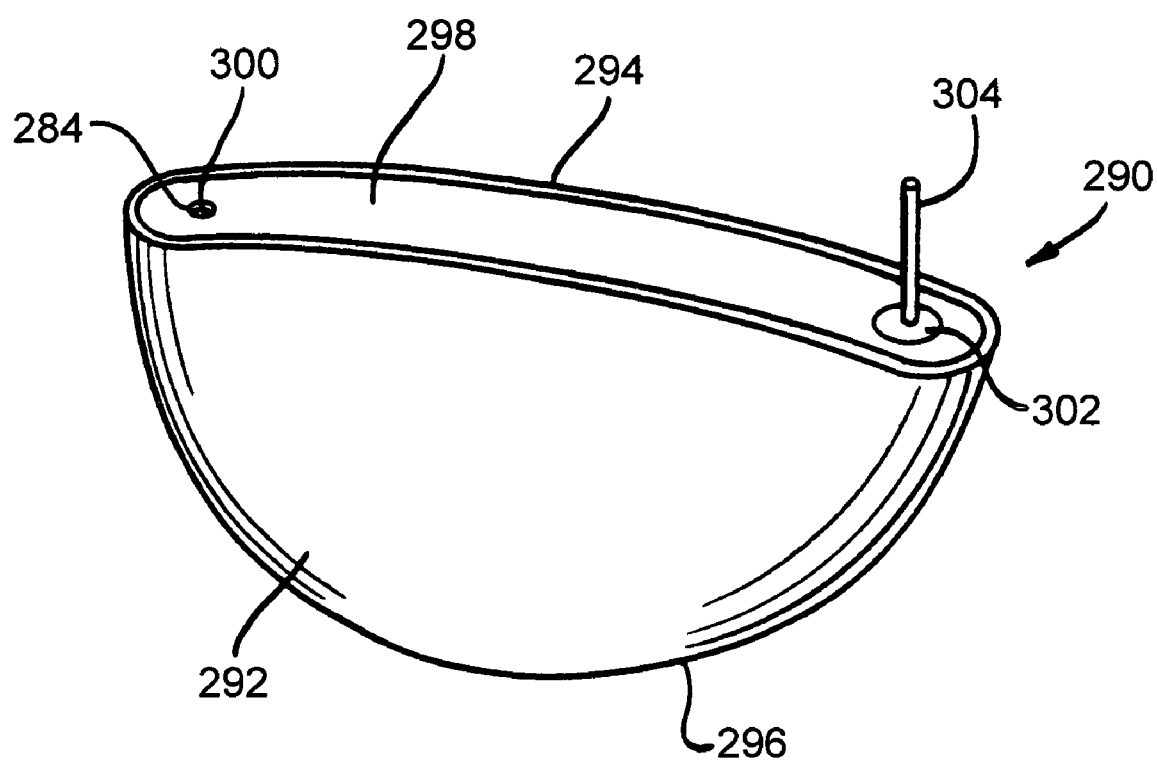
FIG. 14 is an elevational view of another embodiment of a cell 290 according to the present invention.

FIG. 14 illustrates another embodiment of a contoured casing 290 having spaced apart and opposed major front and back side walls 292 and 294. The walls 292, 294 each have a generally semicircular shape with a planar upper edge. The walls 292, 294 extend to and meet with a semicircular intermediate end wall 296 that curves to meet them along their entire radial perimeter. The side walls 292, 294 and end wall 296 form the casing as a unitary member, deep drawn member. Both of the major front and back side walls 292, 294 have a curved shape of a continuous radius deflecting in a similar direction and extending from the end wall 296.

The side walls and end wall of the deep drawn casing 290 form an opening closed by a lid 298. The lid also includes an electrolyte fill opening 284 closed by ball 300 and a terminal pin opening supporting a ring of insulation glass 302 surrounding a terminal pin 304 for one of the anode and the cathode. The casing 290 serves as the terminal for the electrode. For a more detailed description of this type of cell, reference is made to U.S. Pat. No. 5,905,001 to Elliott et al., which is assigned to the assignee to the present invention and incorporated herein by reference.

The previously described cell stacks 248, 252 are of either an alkali metal/solid cathode or alkali metal/oxyhalide chemistry of both solid cathode and liquid electrolyte types. In the primary solid cathode type, for example a lithium-solid cathode cell, a solid cathode active material such as silver vanadium oxide or copper silver vanadium oxide, is contained within the contoured casing and surrounded by a separator, such as of a polypropylene fabric or cloth. Contemplated solid cathode active materials are not limited to silver vanadium oxide and copper silver vanadium oxide, but, can also be manganese dioxide, cobalt oxide, nickel oxide, copper oxide, copper sulfide, iron sulfide, iron disulfide, titanium disulfide, copper vanadium oxide, and mixtures thereof. Lithium is preferred as the anode active material.

In the liquid cathode/electrolyte or catholyte type cell, for example a lithium-oxyhalide cell, liquid catholyte fills the casing interior and is in operative contact with the anode electrode and with the cathode element comprising the current collector 152 sandwiched between opposed carbonaceous plates. A separator is disposed between the anode and the carbonaceous cathode. For a more detailed description of such a cell reference is made to U.S. Pat. No. 4,246,327 to Skarstad et al., which is assigned to the assignee of the present invention and incorporated herein by reference.

By way of example in an illustrative primary cell, the cathode active material is a silver vanadium oxide material as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention and incorporated herein by reference. The cathode current collector is of titanium and terminal lead 152, 192 is of molybdenum, the electrolyte is a 1.0M to 1.4M solution of $LiAsF_6$ or $LiPF_6$ in a 50:50 mixture of, by volume, 1,2-dimethoxyethane and propylene carbonate, glass seal 58, 98 is of TA-23 Hermetic sealing glass, and closure means 148, 188 is of stainless steel. The lithium anode is preferable in sheet form contacted to both sides of a nickel foil current collector.

In a secondary electrochemical cell, the anode or negative electrode comprises an anode material capable of intercalating and de-intercalating the anode active material, such as the preferred lithium. A carbonaceous negative electrode comprising any of the various forms of carbon (e.g., coke, graphite, acetylene black, carbon black, glass carbon, "hairy carbon" etc.) which are capable of reversibly retaining the lithium species is preferred. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

A preferred electrolyte for a secondary cell is described in U.S. application Ser. No. 09/669,936, which is assigned to the assignee of the present invention and incorporated herein by reference.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, which comprises:
   a) a negative electrode;

b) a positive electrode;

c) a casing housing the negative and positive electrodes, wherein the casing comprises a first portion having a first major side wall extending to and meeting with a first surrounding side wall and a second portion having a second major sidewall extending to and meeting with a second surrounding side wall and wherein the first and second portions are mated to each other with a first outer edge of the first surrounding side wall facing the second major side wall and a second outer edge of the second surrounding side wall facing the first major side wall with at least a portion of the first surrounding side wall in an overlapping relationship with a portion of the second surrounding side wall having the first outer edge hermetically secured to the second surrounding side wall and wherein the first and second major sidewalls deflect in a similar direction; and d) an electrolyte provided in the casing to activate the negative and positive electrodes.

2. The electrochemical cell of claim 1 wherein the first and second major side walls are continuously curved.

3. The electrochemical cell of claim 1 wherein the first major side wall is of a greater curvature than the second major side wall.

4. The electrochemical cell of claim 1 wherein at least one of the first and second major side walls is of at least a first and second different curvatures, the first curvature transitioning into the second curvature.

5. The electrochemical cell of claim 1 wherein at least one of the first and second major side walls is of at least a first and a second different curvatures with a generally planar surface disposed between the first curvature and the second curvature.

6. A casing for an electrochemical energy storage device, the casing comprising:

a) a first portion having a first major side wall extending to and meeting with a first surrounding side wall; and b) a second portion having a second major side wall extending to and meeting with a second surrounding side wall, wherein the first and second portions are matable to each other with a first outer edge of the first surrounding side wall facing the second major side wall and a second outer edge of the second surrounding side wall facing the first major side wall with at least a portion of the first surrounding side wall in an overlapping relationship with a portion of the second surrounding side wall having the first outer edge hermetically secured to the second surrounding side wall and wherein the first and second major sidewalls deflect in a similar direction.

7. The casing of claim 6 wherein the first and second major side walls are continuously curved.

8. The casing of claim 6 wherein the first major side wall is of a greater curvature than the second major side wall.

9. The casing of claim 6 wherein at least one of the first and second major side walls is of at least a first and second different curvatures, the first curvature transitioning into the second curvature.

10. The casing of claim 6 wherein at least one of the first and second major side walls is of at least a first and a second different curvatures with a generally planar surface disposed between the first curvature and the second curvature.

11. A method for providing an electrochemical cell, comprising the steps of:

a) providing a first casing portion having a first major side wall extending to and meeting with a first surrounding side wall;

b) providing a second casing portion having a second major side wall extending to and meeting with a second surrounding side wall;

c) nesting a negative electrode and a positive electrode inside one of the first and the second casing portions;

d) connecting the negative and positive electrodes to respective terminals;

e) sealing the other of the first and second casing portions to the one of the first and the second casing portions with a first outer edge of the first surrounding side wall facing the second major side wall and a second outer edge of the second surrounding side wall facing the first major side wall with at least a portion of the first surrounding side wall in an overlapping relationship with a portion of the second surrounding side wall having the first outer edge hermetically secured to the second surrounding side wall and having the first and second major sidewalls deflecting in a similar direction;

f) activating the negative and positive electrodes with an electrolyte provided in the sealed first and second casing portions through a fill opening; and g) sealing the fill opening.

12. The method of claim 11 including providing the first and second major side walls being continuously curved.

13. The method of claim 11 including providing the first major side wall of a greater curvature than the second major side wall.

14. The method of claim 11 including providing at least one of the first and second major side walls of at least a first and second different curvatures, the first curvature transitioning into the second curvature.

15. The method of claim 11 including providing at least one of the first and the second major side walls of at least a first and a second different curvatures with a generally planar surface disposed between the first curvature and the second curvature.

* * * * *